(No Model.)

E. C. SOULE.
STAVE MACHINE.

No. 466,630.             Patented Jan. 5, 1892.

WITNESSES
Geo. E. Frech.
Roland A. Fitzgerald

INVENTOR
E. C. Soule
per Lehmann & Pattison
Attys.

THE NORRIS PETERS CO., PHOTO-LITHO., WASHINGTON, D. C.

UNITED STATES PATENT OFFICE.

EDWARD C. SOULE, OF SOMERSET, KENTUCKY.

STAVE-MACHINE.

SPECIFICATION forming part of Letters Patent No. 466,630, dated January 5, 1892.

Application filed April 29, 1891. Serial No. 390,959. (No model.)

*To all whom it may concern:*

Be it known that I, EDWARD C. SOULE, of Somerset, in the county of Pulaski and State of Kentucky, have invented certain new and useful Improvements in Stave-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in stave-machines.

The object of my invention is to produce a cheap and simple machine in which both sides of the stave are dressed and from which the stave is automatically discharged after being finished.

The invention consists in certain novel features of construction and combinations of parts fully pointed out and described hereinafter.

Figure 1:
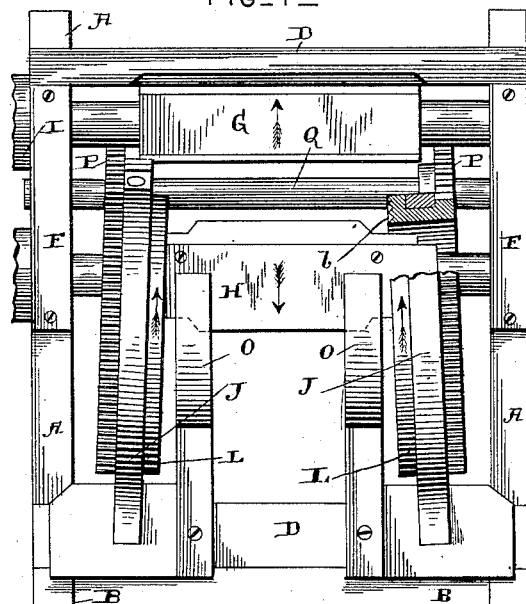
Figure 2:
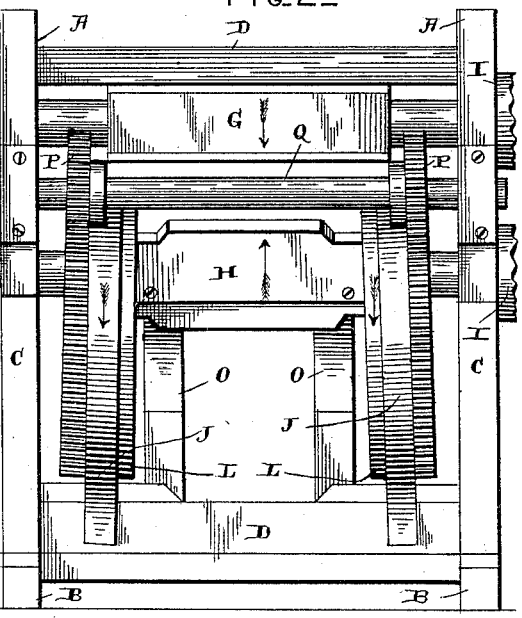
Figure 3:
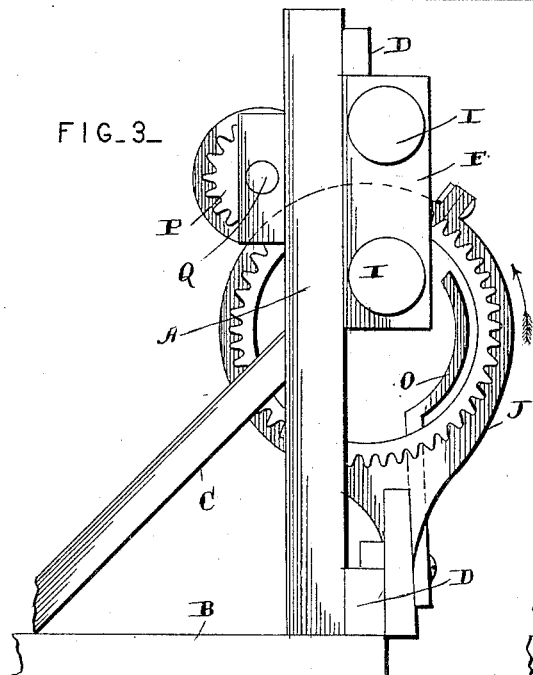
Figure 4:
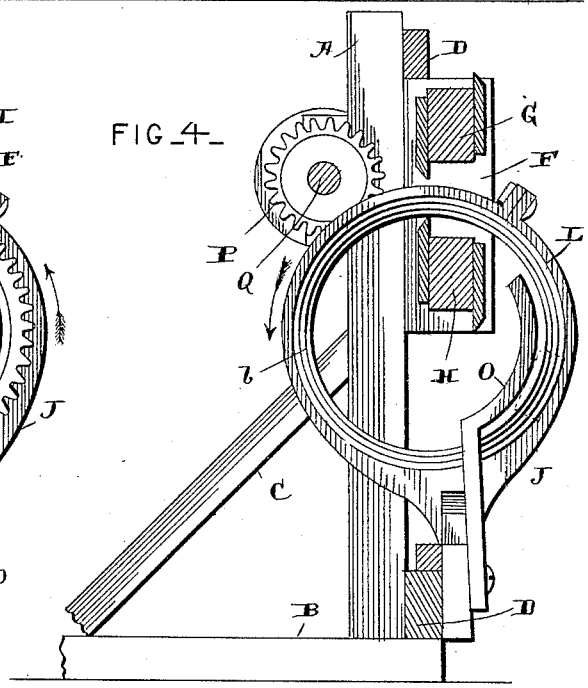

Figures 1 and 2 are end elevations of a stave-machine which embodies my invention, taken from opposite ends. Fig. 3 is a side view of the same. Fig. 4 is a central vertical cross-section.

A A represent suitable uprights or standards, which are secured to sills B at their lower ends and which are braced in position by the braces C and the two cross-pieces D, which are secured to the uprights at their upper and lower ends. In suitable boxes F, mounted upon the uprights A, are the revolving cutters G H, which revolve at a high rate of speed in opposite directions and which are driven by means of the pulleys I. Secured to the lower cross-piece D are suitable supports J, which are made circular in shape and which are inclined slightly toward each other at their upper ends, so as to be nearer together at their tops than at their bottoms. Placed in these supports are the feed-wheels L, which are provided with gear-teeth at their outer ends and which have their inner ends throughout their entire lengths provided with sharp biting or grasping serrations *l*, so as to catch hold of the pieces of lumber out of which the staves are to be made, and which wheels are also nearer together at their upper than at their lower edges, so that the piece of lumber will be securely held between them while being operated upon by the cutters G H.

In order to guide the operator in placing the pieces of lumber uniformly in between the ends of the feed-wheels, and thus have the machine do absolutely uniform work, the guides or gages O are used, which are secured between the two rotary feed-wheels L L. These guides are made straight at their lower ends, but have their upper ends curved, as shown, and it is against the outer lower curved portion of the guides that the pieces of lumber are first placed, as shown in dotted lines in Fig. 4. This brings the ends of the pieces of lumber in between the serrated ends of the feed-wheels at that point where they are farthest apart, and then as the pieces of lumber are moved upward by the hand of the operator the wheels gradually take hold of opposite ends and hold it rigidly, while the cutters operate upon opposite sides for the purpose of shaping the stave. The stave is then carried on over the lower cutter and drops out upon the opposite side of the machine at that point where the wheels are too far apart to any longer clamp it between them.

The feed-wheels are driven by the pinions P, placed upon opposite ends of the shaft Q, which is driven from either end by a pulley *p* or any suitable form of gearing. While the cutters are driven at a high rate of speed, these feed-wheels are driven slowly, and hence each cutter dresses but a small portion of the stave at a time. Any desired number of pieces of lumber can be placed between the feed-wheels as they revolve, and each one will be given a shape corresponding to the shape of the cutters employed in dressing them.

It should be observed that the feed-wheels at their lower sides are farther apart than the length of the staves, while the distance between their upper sides or portions between and adjacent to the cutters is slightly less than the length of the staves. Hence when the stave-blanks are placed on the guides or gages between the feed-wheels and are forced toward the cutters the serrations of the feed-wheels gradually and automatically take hold of and bite into the stave-blank ends and carry said blank slowly around between the cutters until the portions of the wheels carrying the stave begin to separate at the side opposite the cutters, when the stave drops out automatically, or, if it hangs for any reason, it will strike the inner side of the lower straight portion of the guides O O, which will knock it out from the feed-wheels.

The drawings show the outer cutter formed to make the outer side of the stave straight and the inner cutter formed to concave it, except at the ends; but of course for different uses differently-shaped staves will be needed, and consequently differently-shaped cutters will be employed.

Having thus described my invention, I claim—

1. In a stave-machine, the combination of the two rotary cutters arranged in opposition and the two feed-wheels arranged in relation to the cutters, as set forth, the inner ends of said wheels being formed to grasp the stave ends and carry the staves between said cutters, the sides of the wheels between said cutters being arranged closer together than the sides opposite said cutters, for the purpose described.

2. The combination, with the two rotary cutters arranged to act on opposite sides of a stave, of the two rotary feed-wheels arranged substantially as set forth and inclined toward each other on one side, so that the sides of the wheels between the cutters will be nearer together than the opposite sides, as set forth.

3. In combination, a frame, the two rotary cutters, the two circular supports passing between the cutter-shafts and inclined toward each other, the two rotary feed-wheels in said supports and inclined toward each other, as set forth, the inner ends of said wheels being serrated to grasp the stave ends, and means to rotate said wheels, substantially as shown.

4. In combination, a frame, the two rotary cutters mounted in the upper part thereof, the two supports extending from the bottom of the frame, having the upper circular portions inclined toward each other and extending between the shafts of said cutters, the two feed-wheels in said supports and inclined toward each other to grasp and drop the staves, having the inner ends provided with gripping-surfaces and the gearing on their outer ends, means to drive said wheels, and the curved guides between said wheels, as set forth.

5. In a machine of the character described, the two rotary feed-wheels inclined toward each other, so that the distance between their inner gripping ends will be greater than the length of the stave on the side opposite the cutters and will be less than the length of the stave on the side between and adjacent to the cutters, as and for the purposes set forth.

6. In combination, the two uprights, a bottom sill, the two parallel oppositely-rotating cutters mounted in said uprights above the lower ends thereof, the two circular supports secured to the said sill between the uprights and extending upwardly, the rotating open feed-wheels in said supports, the lower cutter extending through the feed-wheels, the said wheels having gear-teeth on their outer ends and their inner ends formed with continuous biting serrations and having their inner ends different distances apart, respectively less and greater than the lengths of the staves, for the purpose described, and the drive-shaft provided with the gears for said wheels, substantially as shown and described.

7. In a wood-working machine, the rotary feed-wheels having inner holding-faces and inclined substantially as described, so that they are nearer together on one side of their axes than on the other side, for the purpose set forth, and driving means, combined and arranged to operate substantially as shown and described.

In testimony whereof I affix my signature in presence of two witnesses.

EDWARD C. SOULE.

Witnesses:
S. W. NEWELL,
W. C. RICHARDSON.